STORAGE CONTAINER FOR LIQUID MATERIALS

Filed Feb. 12, 1964 8 Sheets-Sheet 1

Inventors
RUDOLF BECKER
HANS PROGLER

By Toulmin & Toulmin
Attorneys

Inventors
RUDOLF BECKER
HANS PROGLER
By Toulmin & Toulmin
Attorneys

April 18, 1967 R. BECKER ET AL 3,314,567

STORAGE CONTAINER FOR LIQUID MATERIALS

Filed Feb. 12, 1964 8 Sheets-Sheet 3

Inventors
RUDOLF BECKER
HANS PROGLER
By Toulmin & Toulmin
Attorneys

Inventors
RUDOLF BECKER
HANS PROGLER

By Toulmin & Toulmin
Attorneys

Inventors
RUDOLF BECKER
HANS PROGLER
By Toulmin & Toulmin
Attorneys

April 18, 1967 R. BECKER ET AL 3,314,567

STORAGE CONTAINER FOR LIQUID MATERIALS

Filed Feb. 12, 1964 8 Sheets-Sheet 6

Inventors
RUDOLF BECKER
HANS PROGLER
By Toulmin & Toulmin
Attorneys

Inventors
RUDOLF BECKER
HANS PROGLER
By Toulmin & Toulmin
Attorneys

Inventors
RUDOLF BECKER
HANS PROGLER
By Toulmin & Toulmin
Attorneys

United States Patent Office 3,314,567

Patented Apr. 18, 1967

3,314,567
STORAGE CONTAINER FOR LIQUID MATERIALS

Rudolf Becker, Munich-Solln, and Hans Progler, Trostberg, Germany, assignors to Gesellschaft für Linde's Eismaschinen Aktiengesellschaft, Munich, Germany Filed Feb. 12, 1964, Ser. No. 344,325
Claims priority, application Germany, Feb. 15, 1963, G 37,077
13 Claims. (Cl. 220—15)

This invention relates to the storage and transportation of liquids in large volume and at low temperature.

More specifically the invention relates to tank or container structures for the storage and transportation, in ships or the like, at atmospheric pressure, of liquified gas having a boiling point below −40° F. at atmospheric pressure.

The invention further relates to the specific configuration of the container or tank employed in storing and transporting this liquid and its relation to the transporting vehicle.

Further, the invention concerns the manner of mounting the novel tank construction in the body of a vehicle or tank ship.

One of the objects of the invention is to mount the tank or container in the tank ship and yet provide for expansion of the container or tank in all directions.

Another object is to provide a tank that will readily lend itself to the application of props between walls of the tank and the walls of the tanker.

Further, another object of the invention is to provide a tank whose walls are reinforcible with external I-beams so that the tank walls cannot be pressed inwardly by the props or expanded outwardly by any pressure that might develop from within the tank.

Another object is to provide a tank structure of the type described which is capable of serving as an independent cargo container and is capable of withstanding the stresses applied to the side walls of the tank by reason of its contents.

The novel structural features of the containers of this invention consist in having the outer walls of the container supported at intervals by trusses or struts, with the sections between the props bulged outwardly. The trusses or struts which support the outer walls can be in the form of anchor rods under tension inside the container, or they can be in the form of intermediate walls, preferably with small spacing.

A construction that has been found to be especially advantageous has two opposite side walls of the container supported at intervals by rigid walls while the two remaining side walls are supported by structural members under tension inside the container.

According to a special feature of this invention, the props which are carried by the rigid walls of the vehicle for supporting the container walls at spaced locations are of such construction that they will permit only vertical expansion and contraction of the container walls while all the other supports for these walls will permit expansions and contractions in both vertical and horizontal directions.

An essential feature of all these constructions is that the bulged outer walls of the container are substantially self-supporting and need to be supported by the above-mentioned props in only the simplest manner. According to another feature of this invention, the rounded outer corners of the container are formed of approximately circular cylindrical parts to which the bulged outer wall portions are joined along their lines of intersection.

The bulged outer wall portions are advantageously formed of approximately circular hollow cylindrical sections whose radii of curvature are aproximately the same as those of the corner sections.

In another form of this container, the hollow cylindrical vertical corner pieces are extended above and below the container with the cylindrical extensions closed above by cover members and below by bottom plates. In the bottoms of the upwardly and downwardly extended sheet-metal corner members, pumps or pump pedestals can be introduced through manholes. The bulged cylindrical and spherical parts are preferably reinforced internally.

The outer walls of the container preferably consist of, e.g. two parallel bulged sheet metal sections welded at their adjacent edges to one or more elongated beams, preferably of double T- or I-beam construction.

The cut edges of the container are preferably reinforced by special beams with which either an intermediate wall or the bulged outer walls of two adjacent tank-wall sections are welded together. In this manner all welded joints will remain accessible. In a similar manner the intersections of transversely extending walls inside the container are formed by welding the edges of the wall sections to beams of cruciform configuration.

In another advantageous construction, beams welded to the intermediate walls (in the container or profile bars welded thereto) extend outwardly beyond the adjacent welded edges of the wall sections and terminate outside the container in surfaces by which the container can be supported from beneath or laterally from the sides.

In tankers it is contemplated for space economy to use trapezoidal containers. For that purpose, the side wall portions of the container are formed of conic sections, preferably with vertical axes so that in every horizontal section all the bulged wall portions will have the same radius of curvature.

For the formation of trapezoidal side walls the preferably vertically bulged tank corners are formed as parts of hollow cones whose edges are connected by structures that are capable of yielding under compression or tension, while the bulged side wall sections, similar to the cylindrical sections already described, or the horizontal sections through conical portions, will all have equal radii of curvature.

The invention will be best understood from a consideration of the following detailed description taken in connection with the accompanying drawing.

In the drawing

Figure 1:
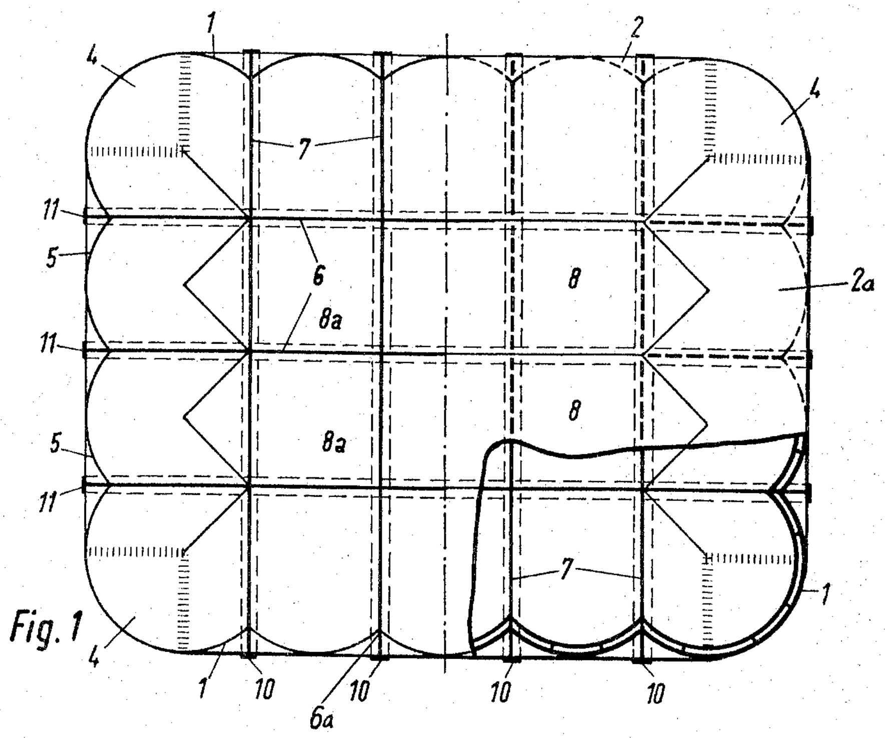
FIGURE 1 is a plan view of a rectangular-parallelepipedal container with bulged outer wall portions, and partly broken away.
Figure 2:
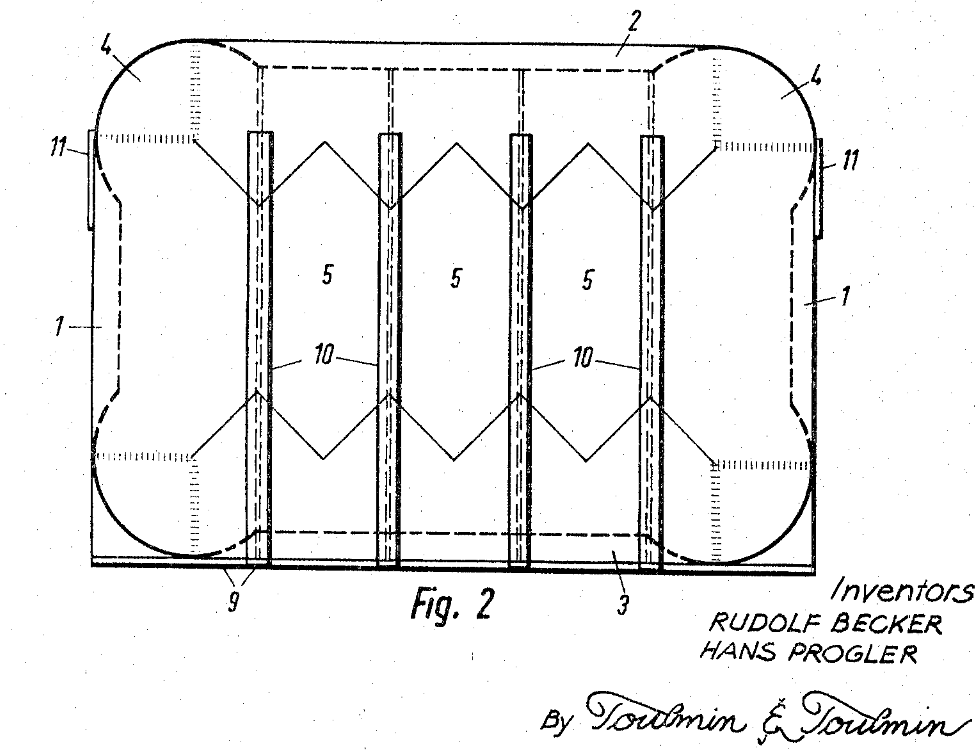
FIGURE 2 is a side view of the container of FIGURE 1.
Figure 3:
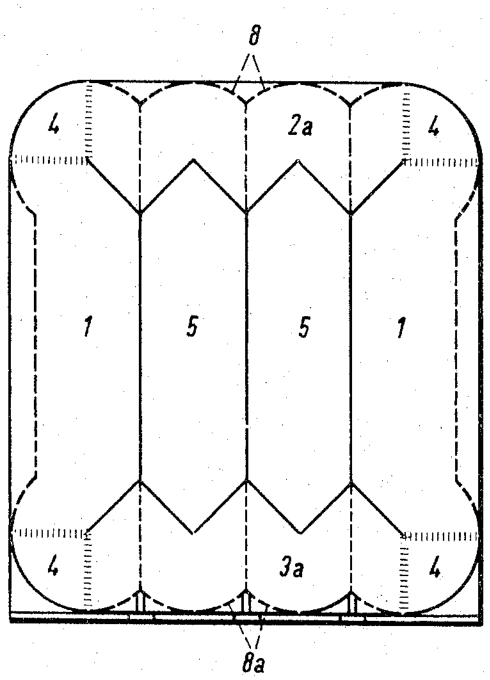
FIGURE 3 is a profile view of the same container.

Referring now more particularly to the drawings, the container or tank of this invention as shown in FIGURES 1, 2 and 3 consists of hollow cylindrical vertical corner pieces 1 of sheet metal whose upper ends intersect and are connected to horizontal corner pieces 2 and 2*a*.

The lower ends of the hollow cylindrical corner pieces 1 intersect and are connected to corresponding horizontal corner pieces 3 and 3*a*.

The outermost upper and lower corners 4 or trihedral angles of the container or tank are approximately spherical in form due to the merging of the horizontal and vertical corner pieces.

The side walls of the container or tank have a plurality of vertically extending bulges consisting of vertically extending intersecting cylindrical sections of sheet metal, these vertically extending sections also intersect and are connected to the top and bottom horizontal sections. The top and bottom walls of the container are formed of parallel intersecting cylindrical sections 8 and 8' respectively, which are similar to the side cylindrical sections. In the side walls the intersection of the vertically extending cylindrical sections form vertical grooves 6*a*. These grooves extend between the outwardly bulging cylindrical portions of the side walls.

The adjacent edges between the sections 5 and 1 are joined to intermediate walls 6 and 7 extending transversely of each other in the container. The walls 6 and 7 are extended outwardly slightly beyond their lines of junction with the sections 5 and 1, while below and at the sides they are strengthened by beams 10 and 11.

Figure 4:
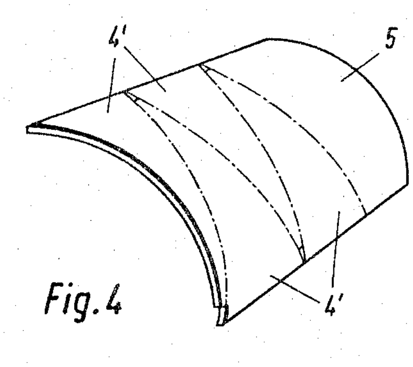
FIGURES 4 and 5 show certain details of construction of the corners of the container.
Figure 5:
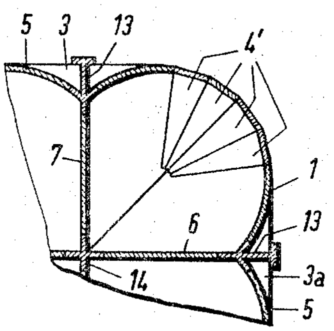

The hollow spherical portions 4 are preferably formed, as shown in FIGURES 4 and 5, by cutting tapered sections 4' from hollow cylindrical corner pieces 5 and welding them together.

As is also shown in FIGURE 5, the edges of sections 1, 5 and 6, or 1, 5 and 7, or 5, and 6 or 7 are welded to special beams 13 in such a manner that each welded joint is readily accessible. The intermediate walls 6 and 7 which traverse each other in perpendicular directions, are formed of sections joined to each other by cross-beams 14, whereby the same result is produced. The special beams 13 are provided at their outer edges with suitable surfaces for supporting from outside.

Figure 6:
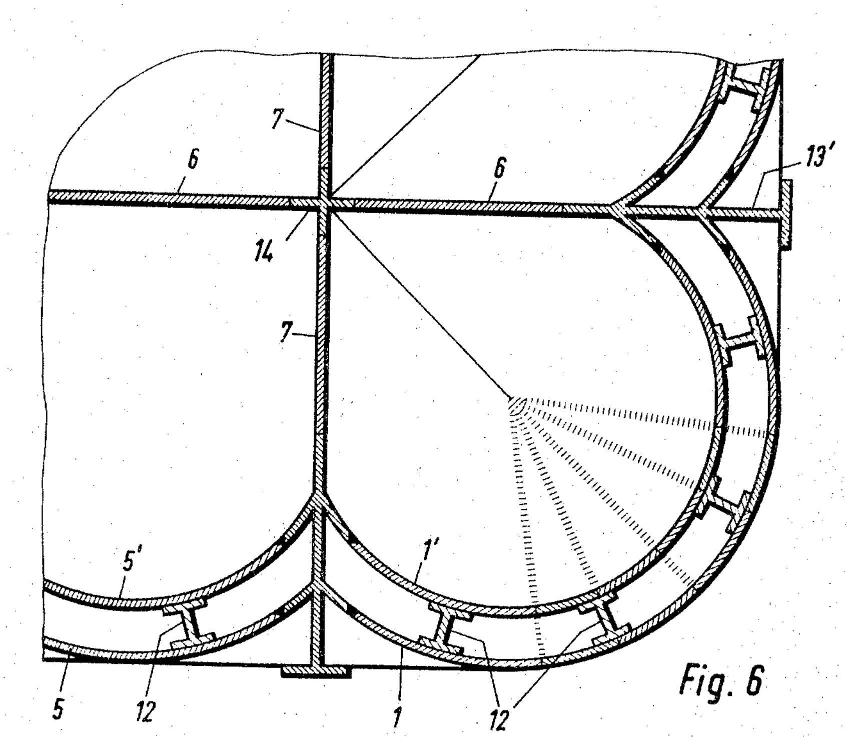
FIGURE 6 shows an enlarged outer corner of a double-walled container structure in cross-section.
Figure 7:
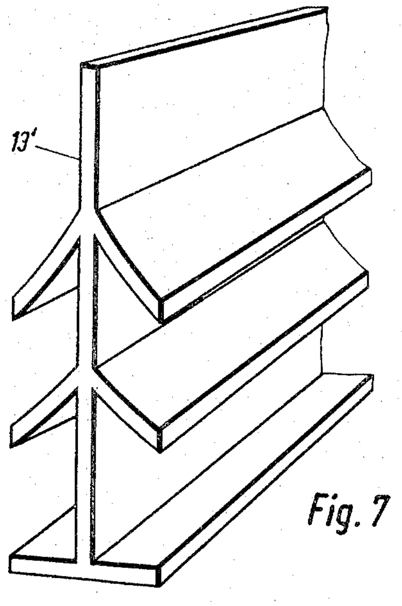
FIGURE 7 shows in perspective a welding beam of the kind used in the construction of FIGURE 6.

The cross-sectional showing in the lower right-hand corner of FIGURE 1 is represented on a larger scale in FIGURES 6 and 7. The hollow, partly cylindrical sections 1, 1' and also the side wall sections 5 and 5' are shown there as being connected by double T-beams or I-beams 12, and at their free edges are welded to special beams 13', one of which is shown in FIGURE 7 enlarged. All the welded joints are here readily accessible and the container can be supported from the outside by the exposed outer surfaces of these special beams.

Figure 8:
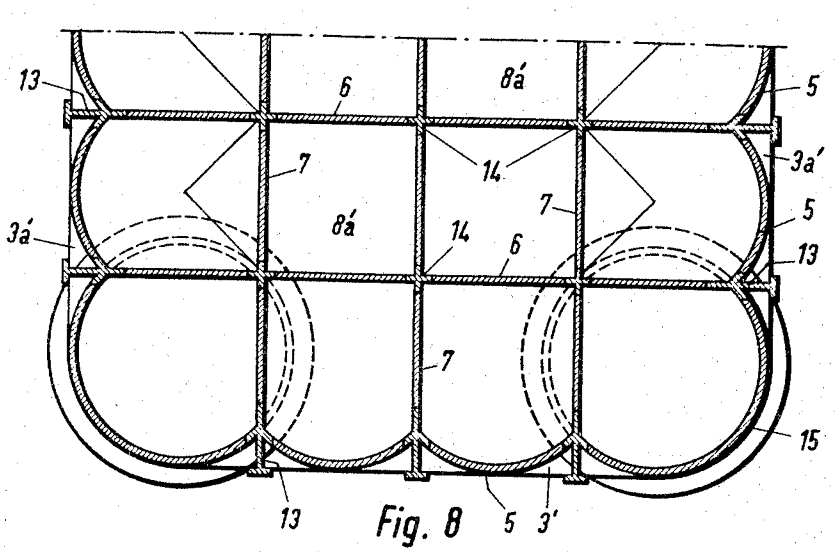
FIGURE 8 is a horizontal section through a container of modified construction with cylindrical corner posts (along the line VIII—VIII of FIG. 9)
Figure 9:
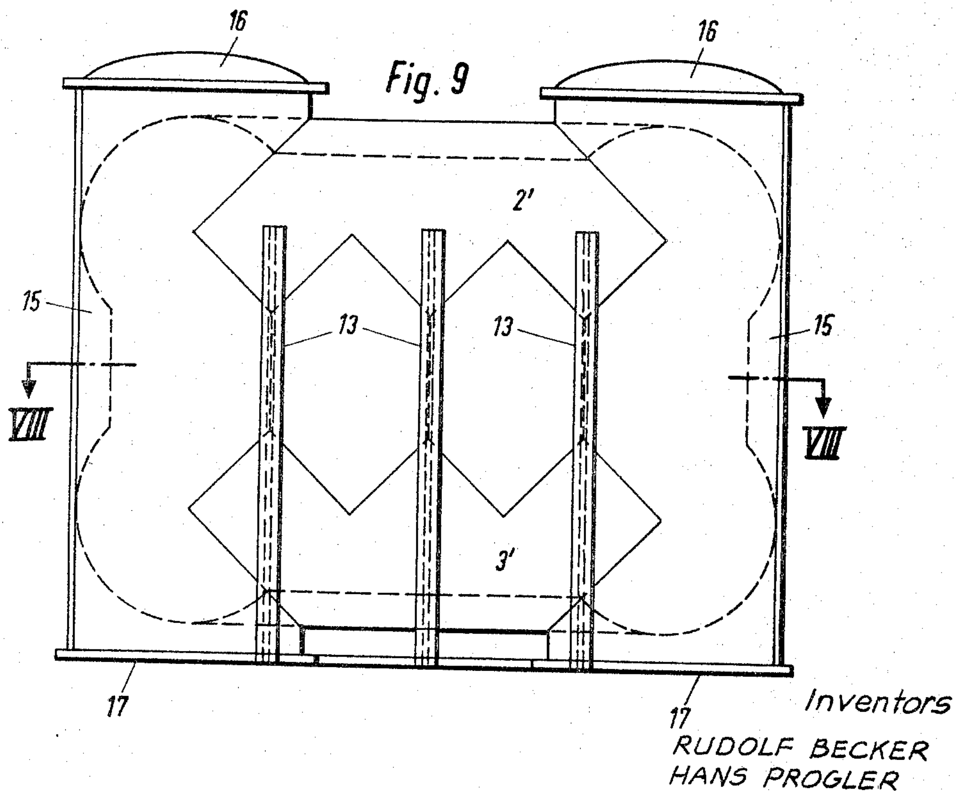
FIGURE 9 is a side view of the structure of FIGURE 8.

FIGURES 8 and 9 show a container of modified construction in which the vertical hollow corner pieces 15 are partly cylindrical in cross-section, whose upper and lower ends have cylindrical extensions with a cover 16 at the upper end, and a bottom plate 17 at the lower end. In this manner, the use of hollow spherical parts for the outer corners can be avoided, with the container presenting only cylindrical surfaces except for the covers 16 and 17.

Figure 11:
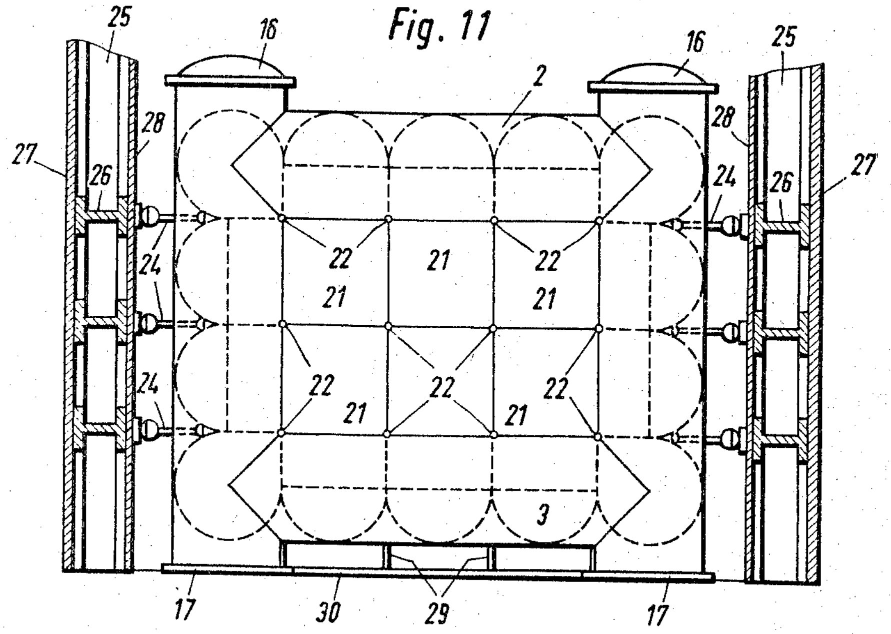
FIGURE 11 is a side view of the container and support assembly of FIGURE 10, with the walls of the ship shown in vertical cross-section.
Figure 10:
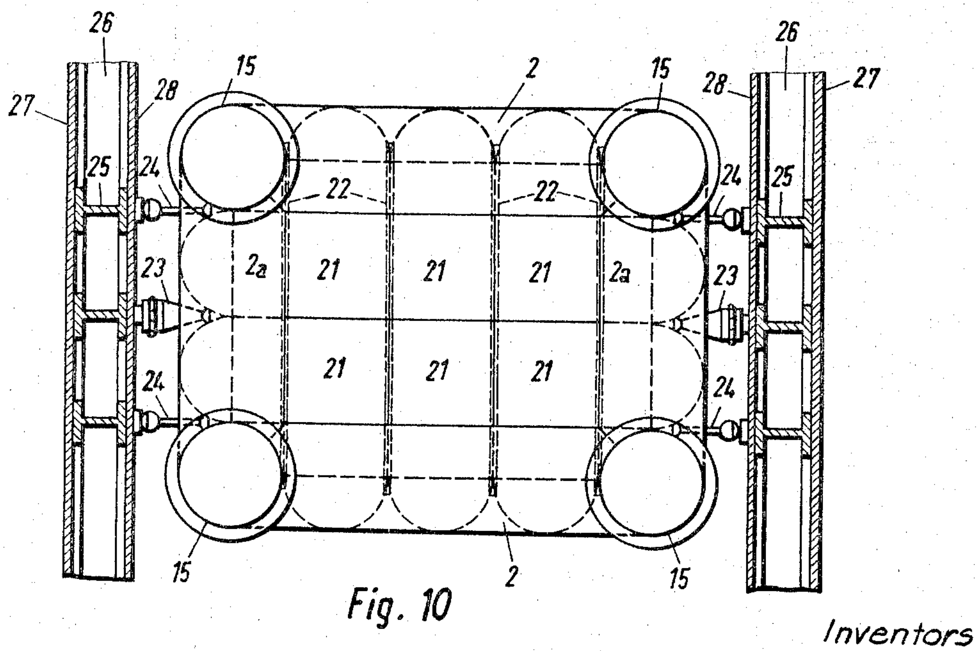
FIGURE 10 is a plan view of a rectangular container with cylindrical corner posts, supported at opposite sides between the side walls of a ship shown in horizontal cross-section, and supported in directions parallel to the ship walls by tension anchors inside the tank.

Another modification is shown in FIGURES 10 and 11; the container here is of such construction that two opposite side walls of the container are supported against the inside walls of the ship while the two remaining opposed side walls are connected by tension members inside the container. The central abutment surfaces on the side walls are supported by vertically swinging hinges 23, while the supporting members 24 at all other points are free to move in any direction. The props 23 and 24 bear against heat-insulating pressure-resisting pads spaced from the ship walls 27 by spacers 25 and 26. With single-walled containers, an intermediate wall 28 can be provided between the movable props 23 and 24 and the stiffening beams 25 and 26. If the container is of the double walled type, the intermediate wall 28 can be omitted. At its bottom the container is supported by longitudinal and transverse beams 29 and 30. The outer walls of the container are formed of sheet-metal panels 21 bulged outwardly in two directions and interposed between the hollow cylindrical corner pieces with the tension members 22 and the props 23 and 24 engaging the junctions between these panels. Instead of tension members 22 anchored to opposite walls, intermediate partitions can be provided. Instead of the panel-like members 21, partly cylindrical sections can be used for connecting opposite corner pieces with each other.

Figure 12:
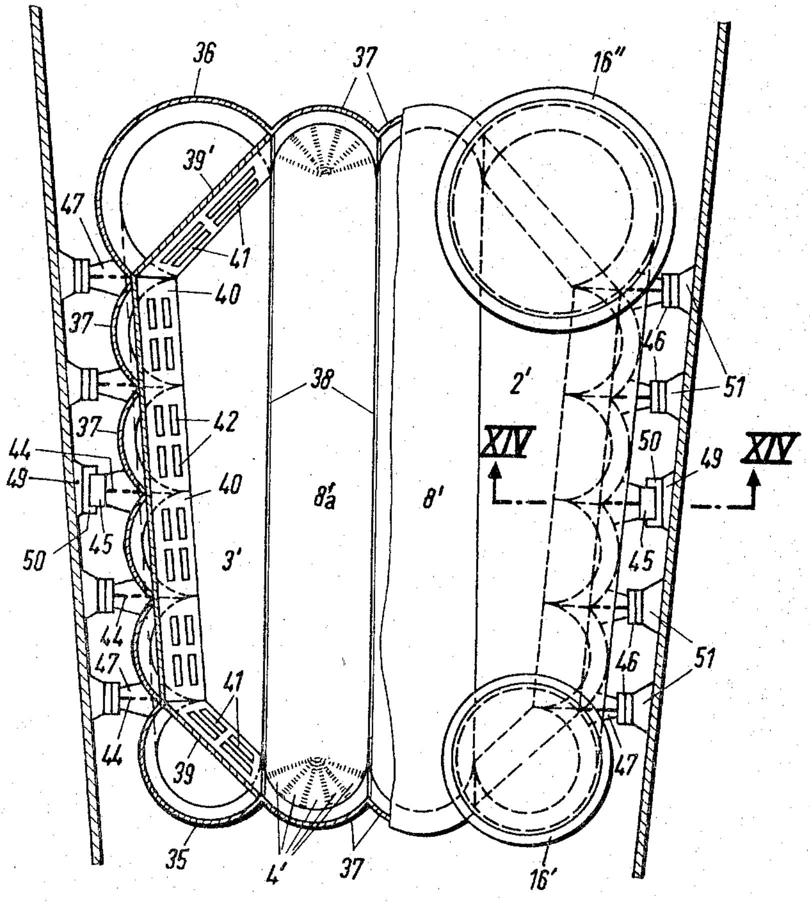
FIGURE 12 is a plan view, partly in section on the line XII—XII of FIGURE 13, of a trapezoidal form of tank supported at its sides by the ship walls shown in horizontal section, and in the longitudinal direction by intermediate walls inside the container.
Figure 13:
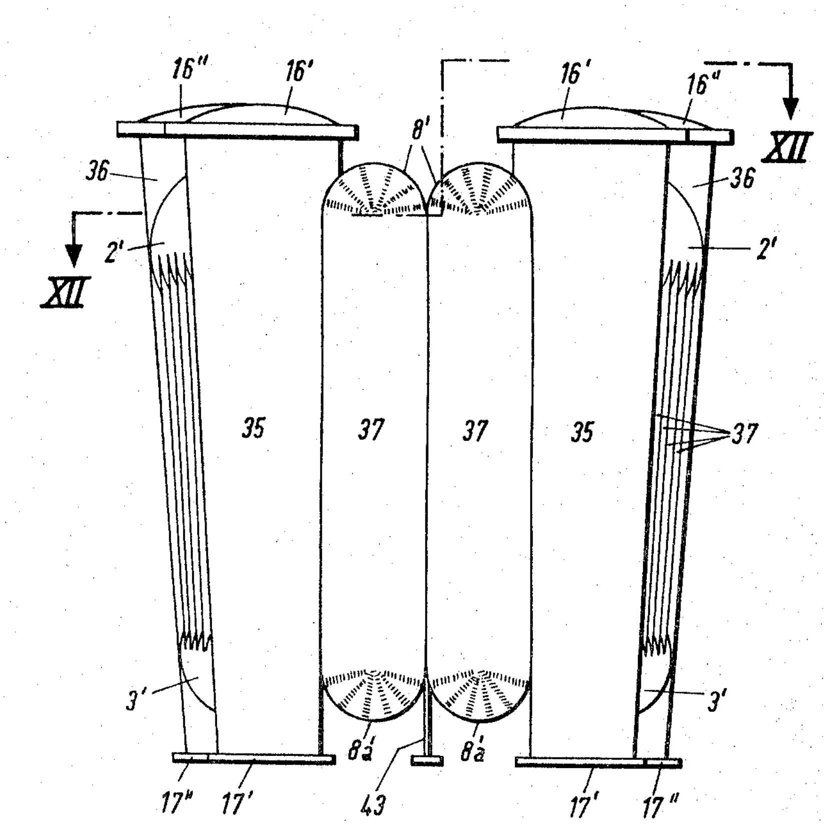
FIGURE 13 is an end view of the container of FIGURE 12.

As shown in FIGURES 12 and 13, the containers of the present invention can be designed to fit ship hulls which are tapered vertically or which converge in the longitudinal direction. The corner columns of such containers are formed of partly conical hollow members of small diameter, as at 35, and of larger diameter, as at 36, so that the container is trapezoidal horizontally and vertically. The bulged side members 37 are also partly conical in form. The junctions between these side wall sections 37 are joined to longitudinal partitions 38. In order to give the container the necessary rigidity, the opposite edges of the corner columns 35 and 36 are connected by diagonal walls 39 and 39'. In the longitudinal direction additional intermediate walls 40 are provided to connect the nearest edges of the diagonal walls 39 and 39' with each other. Walls 39 and 39' are provided with openings 41 and walls 40 with openings 42. The upper longitudinal corners of the container are formed of partly conical sheet metal pieces 2', while the lower longitudinal corners are formed of pieces 3'. These upper and lower pieces 2' and 3' are connected by side wall sections 37. Between the upper corner pieces 2' the horizontal partly cylindrical pieces 8' are mounted which at the same time connect the intermediate walls 38. At the bottom of the container there are similar partly cylindrical pieces 8*a'* which connect the lower edges of the intermediate walls. The container is supported from below on the one hand by bottom plates 17 and 17', and on the other hand by the profiles 43 extending downwardly from the intermediate walls 38.

Figure 14:
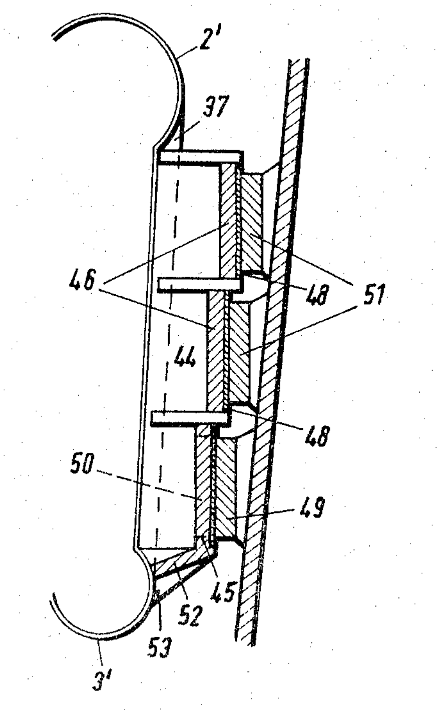
FIGURE 14 is a vertical section on the line XIV—XIV of FIGURE 12, showing a slidable bearing between the container and a side wall of the ship.

The container is supported laterally against the walls of the ship by means of oppositely positioned axially parallel slidable bearings carried by the walls of the ship, as shown in FIGURE 14. In the converging space between two adjacent side wall pieces 37 or 35 and 37, or 36 and 37, a supporting fin 44 is welded in a position perpendicular to the longitudinal axis of the ship. The middle fin 44 in FIGURE 14, in conjunction with its lower supporting plate 45, is not only guided vertically but is also fixed laterally. The two upper supporting plates 46, however, function only as slidable surfaces which can move in all direcitons. The supporting plates 46 or 45 and 46 are connected by transverse ribs 47 with each other and with the supporting fins 44. The plates 45 and 46 have fitted over them slidable plates 48 of low thermal conductivity. The bearing block 49 is attached to the wall of the ship and is provided with lateral guide flanges 50 while the upper blocks 51 serve only as slidable surfaces. All the remaining bearing blocks in FIGURE 12 have constructions similar to block 51 so as to permit free expansion and contraction of the container.

Figure 15:
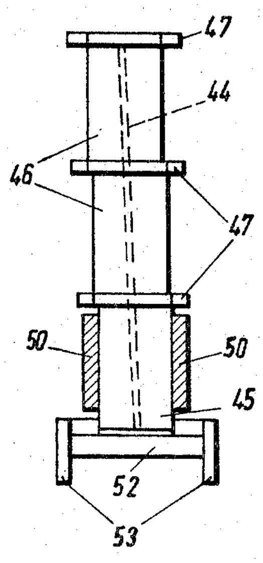
FIGURE 15 is a side view of the slidable bearing shown in FIGURE 14.

With sloping ship walls to which the container must be fitted, the supporting fins are positioned at a slight incline as can be seen in FIGURE 15. The individual superimposed bearing blocks are then similarly displaced. The lower rib 52 with the transverse ribs 53 will then deliver the longitudinal positioning forces of the ship to the lower hollow conical member 3′. The ribs 47 are welded to the bulged side wall sections 37 for greater stiffness.

The container in FIGURES 12–15 does not have any transverse corner members of partly hollow cylindrical form. The middle portions of the tank, therefore, function as resilient cushions which can adjust themselves to the width of the ship while the container is in various states of expansion or contraction.

From the foregoing it will be seen that the present invention provides a new and novel device for storage and transportation of liquid gas.

It will be understood that changes may be made in the details of construction, arrangement and shape of the tank and the elements embodied therein without departing from the spirit of the invention, especially as defined in the following claims.

What is claimed is:

1. A receptacle assembly for the storage and transportation of fluid media such as liquefied gases and the like, said assembly comprising:

a fluid-retaining vessel of generally prismatic configuration having at least two pairs of mutually opposed lateral walls with the walls of each pair extending generally transversely to the walls of the other pair, each of said walls being constituted of a plurality of vertically extending laterally continuous outwardly convex sections each having at least one vertical junction with an adjacent section corresponding to a common intersection of the mutually adjacent sections;

support means externally of said vessel in engagement with the walls of a first of said pairs at the junctions of the convex sections for restricting outward lateral flexing of said walls of said first pair; and tension means within said vessel secured to and interconnecting the walls of the second of said pairs at the said junctions of the sections thereof for restricting outward lateral flexing of said walls of said second pair, said support means including:

two upright support walls confining said vessel between them and juxtaposed with said walls of said first pair;

first support members lying in a vertical plane and each disposed between a respective one of said support walls and bearing upon the juxtaposed wall of said first pair of said vessel walls while engaging same to limit generally horizontal movement of said first pair of vessel walls relative to said support walls in planes parallel to said support walls in the regions thereof engaged by said members while permitting expansion and contraction of said walls of said first pair in vertical direction; and a plurality of second support members disposed between each of said support walls and the juxtaposed wall of said first pair of said vessel walls, and being vertically and horizontally spaced from said first support members, said second support members engaging said walls of said first pair with freedom of horizontal and vertical expansion and contraction of said first pair of vessel walls in planes parallel to said support walls.

2. An assembly as defined in claim 1 wherein said vessel further comprises a plurality of longitudinally extending outwardly convex cylindrical longitudinal-edge sections each interconnecting two of the mutually transverse walls of said first and second pairs of vessel walls at respective further longitudinal junctions therewith, all of said sections constituting generally circular-cylindrical shell segments with substantially identical radii of curvature defined by the intersection of a plane extending generally in the direction of the cylinder axis with the cylinder; and a plurality of generally spheroidal corner shell sections interconnecting said walls at respective corners of said vessel at ends of said further junctions with at least one of said longitudinally extending outwardly convex edge sections, said corner sections being composed of laterally contiguous and interconnected cylindrical sectors of generally triangular projection.

3. An assembly as defined in claim 1 wherein said vessel includes a roof wall and a bottom wall interconnected by said first and second pairs of vessel walls, said vessel further comprising:

a plurality of longitudinally extending outwardly convex generally horizontal longitudinal-edge sections each interconnecting one of the mutually transverse walls of said first and second pairs of vessel walls with one of said bottom and roof walls at respective further longitudinal junctions therewith, all of said sections constituting generally circular-cylindrical shell segments with substantially identical radii of curvature defined by the intersection of a plane extending generally in the direction of the cylinder axis with the cylinder;

a plurality of generally vertical cylindrical shell sections interconnecting said walls at respective vertical edges of said vessel; and cover plates affixed to each of said vertical shell sections at the opposite ends thereof, thereby sealing said vertical sections.

4. An assembly as defined in claim 3 wherein at least one of said cover plates is removably secured to the respective vertical shell section to form a manhole cover affording access to the interior of said vessel.

5. A receptacle assembly as defined in claim 1, further comprising:

stiffening means extending along said junctions and secured to said sections for reinforcing them along said junctions.

6. A receptacle assembly as defined in claim 5 wherein said sections are composed of sheet metal, said stiffening means including:

a plurality of stiffening bars disposed along the junctions of said walls of said second pair, each of said bars having at least two laterally projecting longitudinal flanges each welded to one of the mutually adjacent sections of a respective junction, and a longitudinal web extending into the interior of said vessel;

said tension means including:

a plurality of partitions spanning the interior of said vessel between the walls of said second pair and each secured on its opposite sides to a respective one of said webs, said partition subdividing the interior of said vessel into a plurality of compartments.

7. A receptacle assembly as defined in claim 5 wherein said sections are composed of sheet metal, said stiffening means including:

a plurality of stiffening bars disposed along the junctions of said walls of said first and second pairs, each of said bars having at least two laterally projecting longitudinal flanges each butt-welded to one of the mutually adjacent sections of a respective junction, a longitudinal web projecting outwardly from the vessel, and flange means on said web externally of said vessel.

8. An assembly as defined in claim 1 wherein:

said support walls are downwardly convergent, at least said sections of said one of said pairs of vessel walls are frustoconical shell segments with generally vertical axes, said frustoconical shell segments having substantially identical radii of curvature in each horizontal plane therethrough; and said assembly further comprises:

a plurality of laterally staggered support plates disposed between each of said downwardly convergent support walls and the juxtaposed wall of said one of said first and second pairs, and respective layers of heat-insulating material interposed between each of said plates and the respective support wall.

9. An assembly as defined in claim 1 wherein said vessel further comprises a plurality of generally upright frustoconical corner shell segments interconnecting the walls of said first and second pairs at the corners of the vessel, at least some of said sections of the wall of said first and second pairs being generally upright shell segments, said corner segments each defining a pair of junctions with the shell segments of the walls of said first and second pairs; and reinforcing means spanning the junctions of said corner segments.

10. An assembly as defined in claim 1 wherein said support walls are substantially fixed with respect to one another and said support means includes bearing members slidably interconnecting the juxtaposed vessel and support walls.

11. An assembly as defined in claim 1 wherein said support walls are substantially fixed relative to one another and said support means includes support members interposed between the respective juxtaposed vessel and support walls and swingably connected to at least one of them to permit relative shifting of the walls of said vessel and said support walls.

12. An assembly as defined in claim 1 wherein at least some of said vessel walls are of hollow-wall construction.

13. An assembly as defined in claim 12, further comprising generally I-profile reinforcing bars received in the respective hollow vessel walls and having flanges connected to the wall portions of the respective hollow wall.

References Cited by the Examiner

UNITED STATES PATENTS

| | | | |
|---|---|---|---|
| 720,924 | 2/1903 | Intze. | |
| 1,864,759 | 6/1932 | Pritchard | 220—1 |
| 3,071,094 | 1/1963 | Leroux. | |
| 3,092,063 | 6/1963 | Leroux. | |
| 3,213,632 | 10/1965 | Valk et al. | |

FOREIGN PATENTS

| | | |
|---|---|---|
| 411,972 | 6/1934 | Great Britain. |

THERON E. CONDON, *Primary Examiner.*